United States Patent
Matscheko et al.

(10) Patent No.: US 7,834,489 B2
(45) Date of Patent: Nov. 16, 2010

(54) SYNCHRONOUS LINEAR MOTOR

(75) Inventors: Gerhard Matscheko, Starnberg (DE); Zeljko Jajtic, München (DE)

(73) Assignee: Siemens Aktiengesellschaft, München (DE)

( * ) Notice: Subject to any disclaimer, the term of this patent is extended or adjusted under 35 U.S.C. 154(b) by 156 days.

(21) Appl. No.: 11/994,929

(22) PCT Filed: Jun. 30, 2006

(86) PCT No.: PCT/EP2006/063745
§ 371 (c)(1), (2), (4) Date: Jan. 7, 2008

(87) PCT Pub. No.: WO2007/003601
PCT Pub. Date: Jan. 11, 2007

(65) Prior Publication Data
US 2009/0140583 A1    Jun. 4, 2009

(30) Foreign Application Priority Data
Jul. 5, 2005    (DE)    ........... 10 2005 031 370

(51) Int. Cl.
*H02K 41/00*    (2006.01)
*H02K 41/02*    (2006.01)
(52) U.S. Cl. .......... 310/13; 310/12.01; 310/12.02
(58) Field of Classification Search .......... 310/12, 310/13, 14, 12.01–12.13
See application file for complete search history.

(56) References Cited
U.S. PATENT DOCUMENTS
2006/0012252 A1*  1/2006  Miyata et al. ........ 310/12

FOREIGN PATENT DOCUMENTS

| | | | |
|---|---|---|---|
| DE | 24 49 618 A1 | | 4/1976 |
| DE | 2449618 A1 | * | 4/1976 |
| DE | 27 101 56 A1 | | 9/1978 |
| DE | 2710156 A1 | * | 9/1978 |
| DE | 103 34 736 A1 | | 2/2005 |
| EP | 0 156 013 A | | 10/1985 |
| EP | 0 915 553 A2 | | 5/1999 |
| JP | 59162760 A | | 9/1984 |
| JP | 06038500 A | * | 2/1994 |
| JP | 2003032994 A | * | 1/2003 |
| WO | WO 98/58866 A2 | | 12/1998 |

OTHER PUBLICATIONS

Machine Translation of DE2710156A1 (1978).*
Machine Translation of JP06038500A (1994).*
Machine Translation of JP2003032994A (2003).*
Machine Translation of DE2449618A1 (1976).*

* cited by examiner

*Primary Examiner*—Quyen Leung
*Assistant Examiner*—Jose A Gonzalez Quinones
(74) *Attorney, Agent, or Firm*—Henry M. Feiereisen; Ursula B. Day

(57) ABSTRACT

The invention relates to a synchronous linear motor comprising a mobile primary part (3) and a fixed secondary part (1, 2). The primary part (3) comprises conductive coils (4) and permanent magnets, and the secondary part (1, 2) has a ferrous structure comprising teeth (6, 7) which are oriented towards the primary part (3). The secondary part (1, 2) comprises at least one active region (2) which is characterized in that all of the teeth (7) of an active region (2) also comprise conductive coils (5).

7 Claims, 1 Drawing Sheet

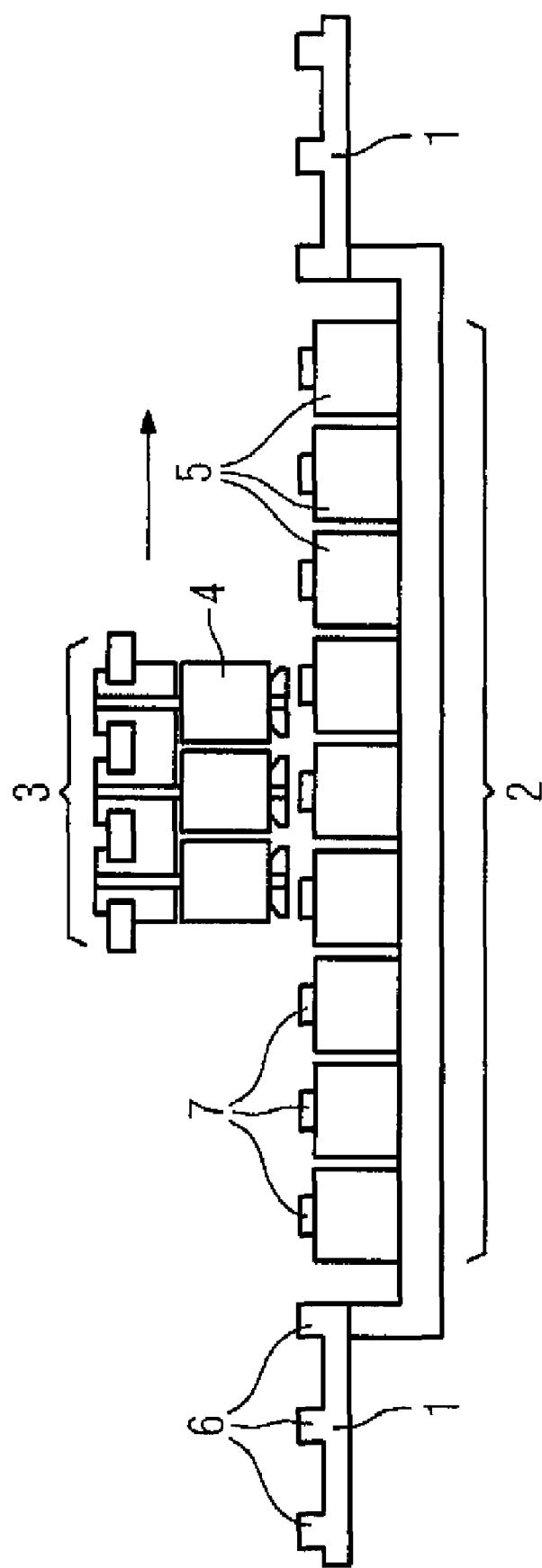

SYNCHRONOUS LINEAR MOTOR

BACKGROUND OF THE INVENTION

The invention relates to a synchronous linear motor with a movable primary part and a fixed secondary part, the primary part having energizable coils and permanent magnets, and the secondary part comprising a structure made from iron with teeth pointing towards the primary part.

Electrical machines are used in a very large number of technical fields. In the case of electrical machines, it is necessary to draw a distinction between DC machines, AC machines and three-phase machines. Three-phase machines can be split into three-phase synchronous machines and three-phase asynchronous machines.

One type of electrical machines is linear motors. These comprise a primary part and a secondary part. In the case of permanent magnet synchronous linear motors with a secondary part without any permanent magnets, the primary part is in this case movable and has energizable coils and permanent magnets. The secondary part comprises a structure made from iron with teeth pointing towards the primary part and accordingly only acts passively.

It is known that linear motors can be used for transport or transfer systems such as transrapid, for example. In these systems, a high performance of the drive is often only required to a locally limited extent, such as on slopes or when approaching or braking at stops.

One disadvantage is the fact that the linear motor in the case of these drives always needs to be designed for the maximum required power. This means that the linear motor and in particular the movable primary part has a comparatively increased volume and a very high mass. The costs for such linear motors are correspondingly high.

SUMMARY OF THE INVENTION

The invention is therefore based on the problem of specifying a permanent magnet synchronous linear motor with a secondary part without any permanent magnets in which the mass and the volume of the movable primary part are markedly reduced given the same driving properties, so that the linear motor can be produced and operated more cost-effectively.

This problem is solved according to the invention by virtue of the fact that the secondary part has one or more active regions, which are characterized by the fact that all the teeth of an active region additionally have energizable coils.

This advantageously means that the magnetic utilization of the primary part at points with an increased power requirement such as on slopes or at stops is increased. In the case of the linear motor according to the invention, therefore not only the coils of the primary part but also coils in the secondary part are fed with current. This double feed is thus achieved by the use of active regions of the secondary part. These likewise comprise a toothed iron structure, but additionally bear energizable coils. These coils may be in the form of wire coils. As a result of these coils being energized, the magnetic flux and therefore the power of the linear motor is increased in the corresponding regions. That is to say that the primary part can be dimensioned so as to be smaller since additionally power is mobilized via energizable coils in the secondary part in the regions with increased power requirements.

A further advantageous configuration results if at least the teeth of an active region have in each case the same distance from one another. This results in an optimum operational response of the synchronous linear motor and in simplified production of the secondary part.

Advantageously, the coils of the secondary part are plugged onto the teeth of the secondary part. This optimizes the magnetic flux.

In order to reduce losses owing to eddy currents, the secondary part advantageously comprises laminate stacks over its entire length or only in sections. The secondary part can alternatively also be manufactured from metal such that it is solid in sections. It is also possible for parts of the secondary part to be constructed so as to be solid from metal parts and for the rest to be formed from laminate stacks.

In order to operate the synchronous linear motor in optimum fashion, a control device is assigned to the primary part and/or the secondary part. This ensures that the coils of the corresponding regions of the secondary part are only supplied with current in the desired time period. Furthermore, the energizing of the primary part and of the secondary part can thus be matched to one another.

Advantageously, the teeth of the secondary part which bear coils have a greater height than the teeth which do not bear any coils, all the teeth of the secondary part being arranged in such a way that their ends which point towards the primary part lie in the same plane. This means that high coils can also be plugged onto the teeth and that the air gap between the primary part and the secondary part is always the same.

A further embodiment results if at least one current source is assigned to the coils in the primary part and the coils in the secondary part, which current source is driven by a control device. Each current source can in this case contain power converters.

Furthermore, at least one sensor for determining the position of the primary part is assigned to the synchronous linear motor. The energizing of the active regions of the secondary part can therefore advantageously be matched to the position of the primary part. The sensor can be realized, for example by a light barrier.

At least those coils of the secondary part are energized in whose electromagnetic circuit of influence the primary part is located. That is to say that if the primary part is located at a stop which has active regions of the secondary part, the coils in the active region of the secondary part are energized so as to accelerate the primary part. The active regions of the secondary part can in this case also be used to brake the primary part. In this case, it is not necessary for the primary part to be energized. Accordingly, it is therefore also possible to realize emergency running of the system if the energizing of the primary part fails.

It is advantageous if in addition also the coils of the primary part are energized since then the full power of the synchronous linear motor is available for acceleration or braking purposes.

BRIEF DESCRIPTION OF THE DRAWING

The invention and further advantageous configurations of the invention in accordance with the features of the dependent claims will be explained in more detail in the text which follows with reference to exemplary embodiments illustrated schematically in the drawing without the invention thereby being restricted to this exemplary embodiment; in the drawing:

FIG. 1 shows a synchronous linear motor according to the invention.

DETAILED DESCRIPTION OF PREFERRED EMBODIMENTS

FIG. 1 shows a synchronous linear motor according to the invention. It comprises a movable primary part 3 and a secondary part. The secondary part in this case has passive regions 1 and active regions 2. In this case, the primary part 3 has energizable coils 4 and permanent magnets. Both in the passive regions 1 and in the active regions 2 the secondary part comprises a structure made from iron with teeth 6 and 7, respectively, pointing towards the primary part 3. Energizable coils 5 are plugged onto the teeth 7 in the active regions 2 of the secondary part.

The teeth 6 and 7 of the primary part in this case each have the same distance from one another. Both in the passive regions 1 and in the active regions 2, the secondary part comprises laminate stacks. In this case, the teeth of the active region 2 are designed to be higher than in the passive regions 1 in order to accommodate the coils 7. All the teeth 6 and 7 of the secondary part are arranged such that their ends which point towards the primary part 3 lie in the same plane.

If the permanent magnet synchronous linear motor according to the invention with a secondary part without any permanent magnets is used as a drive for trains, active regions of the secondary part 2 will be provided where there is an increased power requirement, such as at stops or on slopes, for example. The active regions 2 of the secondary part can in this case be used for accelerating or else for braking the primary part 3 by the coils 5 being energized suitably. Accordingly, the movable primary part 3 can therefore be designed for a lower power since peak powers are covered over active regions 2 of the secondary part. Accordingly, it is also possible to accelerate or brake the primary part 3 by the active regions 2 of the secondary part alone in the event of a fault in the primary part 3, which can be used as an emergency operation mode.

In order to drive the synchronous linear motor, in this case in each case one control device is assigned to the primary part 3 and/or the active regions 2 of the secondary part. These control devices then control the current sources for supplying the primary part 3 and the active regions 2 of the secondary part. The current sources can in this case contain power converters. For optimum driving of the coils 4 and 5, a sensor is used for determining the position of the primary part 3. This sensor can be realized, for example, by one or more light barriers.

What is claimed is:

1. A synchronous linear motor, comprising:
   a movable primary part having energizable coils and permanent magnets; and
   a fixed secondary part comprising a structure made from iron with teeth pointing towards the primary part, said secondary part having one or more active regions, wherein all teeth of an active region additionally have energizable coils, and one or more non-active regions which do not bear coils, wherein the teeth of the secondary part which bear the energizable coils have a greater height than the teeth which do not bear any coils, wherein the teeth of the one or more active regions and of the one or more non-active regions of the secondary part all have identical width and identical gaps between the teeth, and wherein end faces of all teeth pointing towards the primary part lie in a same plane.

2. The synchronous linear motor of claim 1, wherein the coils of the secondary part are tooth-wound coils and are plugged onto teeth of the secondary part.

3. The synchronous linear motor of claim 1, wherein the secondary part comprises laminate stacks.

4. The synchronous linear motor of claim 1, further comprising a control device operatively connected to at least one of the primary part and the secondary part.

5. The synchronous linear motor of claim 1, further comprising at least one current source operatively connected to the coils in the primary part and the coils in the secondary part, and driven by a control device.

6. The synchronous linear motor of claim 5, wherein the current source includes power converters.

7. The synchronous linear motor of claim 1, further comprising at least one sensor for determining a position of the primary part.

* * * * *